United States Patent
McDonough et al.

(10) Patent No.: US 7,324,585 B2
(45) Date of Patent: Jan. 29, 2008

(54) SYSTEM AND METHOD FOR PERFORMING SYMBOL BOUNDARY-ALIGNED SEARCH OF DIRECT SEQUENCE SPREAD SPECTRUM SIGNALS

(75) Inventors: John G. McDonough, La Jolla, CA (US); Gibong Jeong, Stanford, CA (US); Karim Abdulla, San Diego, CA (US); Rajiv R. Nambiar, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 675 days.

(21) Appl. No.: 10/650,427

(22) Filed: Aug. 28, 2003

(65) Prior Publication Data
US 2004/0062297 A1    Apr. 1, 2004

Related U.S. Application Data

(60) Provisional application No. 60/415,212, filed on Oct. 1, 2002.

(51) Int. Cl.
*H04B 1/00*    (2006.01)

(52) U.S. Cl. .................. 375/150; 375/142; 375/143

(58) Field of Classification Search ............... 375/142, 375/143, 147, 148, 150, 343
See application file for complete search history.

(56) References Cited

U.S. PATENT DOCUMENTS 6,304,216 B1 * 10/2001 Gronemeyer ............... 342/378
6,531,982 B1 *  3/2003 White et al. ............ 342/357.09
7,130,331 B2 * 10/2006 Kang et al. ................. 375/149

* cited by examiner

*Primary Examiner*—David B. Lugo
(74) *Attorney, Agent, or Firm*—Ronald O. Neerings; Wade James Brady, III; Frederick J. Telecky, Jr.

(57) ABSTRACT

System and method for performing symbol boundary aligned searches of signals. A preferred embodiment comprises a search control unit (such as search control unit 725) that can determine a start and stop condition for a correlation based on a hypothesis, a searcher (such as searcher 705) which includes a multiplexer that can select a subset of samples of a received sequence based on the hypothesis and start and stop conditions. The search control unit can then wait for the occurrence of the start condition and assign the hypothesis to a correlator, which will correlate the subset of samples with a locally generated pseudo-random number sequence based upon the hypothesis.

25 Claims, 4 Drawing Sheets

FIG. 9

SYSTEM AND METHOD FOR PERFORMING SYMBOL BOUNDARY-ALIGNED SEARCH OF DIRECT SEQUENCE SPREAD SPECTRUM SIGNALS

This application claims the benefit of U.S. Provisional Application No. 60/415,212, filed on Oct. 1, 2002, entitled Method and Apparatus for Performing Symbol Boundary-Aligned Search of DS SS Signals, which application is hereby incorporated herein by reference.

CROSS-REFERENCE TO RELATED APPLICATIONS

This application is related to the following and commonly assigned patent applications: Ser. No. 10/651,120, filed Aug. 28, 2003, entitled "System and Method for Detecting Direct Sequence Spread Spectrum Signals Using Pipelined Vector Processing"; Ser. No. 10/651,282, filed Aug. 28, 2003, entitled "System and Method for Detecting Multiple Direct Sequence Spread Spectrum Signals Using a Multi-Mode Searcher"; Ser. No. 10/439,400, filed May 16, 2003, entitled "System and Method for Intelligent Processing of Results from Search of Direct Sequence Spread Spectrum (DSSS) Signals"; Ser. No. 10/659,905, filed Sep. 11, 2003, entitled "System and Method for Detecting Direct Sequence Spread Spectrum Signals Using Batch Processing of Independent Parameters", which applications are hereby incorporated herein by reference.

TECHNICAL FIELD

The present invention relates generally to a system and method for digital wireless communications, and more particularly to a system and method for performing searches for direct sequence spread spectrum signals wherein the searches are aligned with symbol boundaries.

BACKGROUND

In direct sequence spread spectrum digital wireless communications networks, a necessary part of the communications process for the wireless device is to find certain signals that are transmitted by base stations. An example of such a signal is the pilot channel. In order for the wireless device to find the pilot channel, the wireless device makes use of a searcher. The searcher attempts to acquire synchronization with the base station transmitted pseudo-random number (PN) sequence transmitted on the pilot channel. Synchronization can be used for a variety of purposes, including cell selection (for use in cell hand-offs), finger assignment and maintenance (for use in multipath combining to maximize received signal strength), channel profile estimation, location identification, and so forth.

Synchronization involves correlating a received signal (the PN sequence transmitted on the pilot channel, for example) with a locally stored version of the PN sequence with its PN offset adjusted. The PN offset of the PN sequence, along with other information, such as a dwell time, a window size, and so forth, is commonly referred to as a hypothesis. If the two PN sequences match, then the correlation results in a large value, while the correlation for two PN sequences that do not match results in a small value. The result of the correlation can then be accumulated (both coherently and non-coherently). The accumulated values can then be compared against a threshold. If the accumulated value exceeds the threshold, then the hypothesis can be declared to be a good hypothesis. Obtaining the PN offset is effectively, acquiring the pilot channel.

In direct sequence spread spectrum wireless communications systems using orthogonal spreading codes, as long as the orthogonality is maintained, there is no interference between the signals being transmitted. Examples of such wireless communications systems include IS-95 (an early CDMA (code-division multiple access) communications system standard), CDMA2000 (a third generation CDMA communications system standard), and UMTS (Universal Mobile Telephony System, also a third generation CDMA communications system standard). In these communications systems, the orthogonality of the signals being transmitted is maintained along the symbol boundaries. This means that if a correlation is taken along symbol boundaries, then the signals not being correlated will not interfere with the desired signal. However, if a correlation is taken in between symbol boundaries, then the orthogonality of the signals is no longer ensured and interference can take place.

Additionally, in direct sequence spread spectrum wireless communications using antenna diversity schemes to help improve performance, orthogonality is typically ensured only if accumulation is taken along slot boundaries. For example, if an accumulation straddles a slot boundary, then interference from other transmitted signals may take place and received signal strength can vary significantly.

A commonly used way to search for pilot channels (and other signals) typically involved the sample of received data at specific instances and the correlating the received data samples against different shifts (PN offsets) of the pilot channel PN sequence. This method is easy to implement and requires minimum buffering of the incoming data samples.

A solution to ensure that the accumulations take place along symbol boundaries, involves the hypotheses being tested being parsed and only those that take place along symbol boundaries will be tested. Hypotheses not resulting in symbol boundary accumulations can be held until such a time that their testing will occur along symbol boundaries.

One disadvantage of the prior art is that under very few instances is the accumulation aligned with the symbol boundaries. Therefore, interference from other signals being transmitted can take place and possibly reducing the signal-to-noise ratio of the communications system, hence its overall performance.

A second disadvantage of the prior art is that allowing only the hypotheses with symbol boundary aligned accumulations to be tested can severely reduce the overall throughput of the searcher. Hence the synchronization time can be very long, perhaps longer than what is permitted by the communications network.

A third disadvantage of the prior art is that forcing the hypotheses to wait until the proper time can require a significant amount of buffer space. Therefore increasing the cost and power consumption of the searcher and hence the wireless device.

SUMMARY OF THE INVENTION

These and other problems are generally solved or circumvented, and technical advantages are generally achieved, by preferred embodiments of the present invention which provides for a system and method for ensuring that searches for direct sequence spread spectrum signals occur along specified boundaries.

In accordance with a preferred embodiment of the present invention, a method for testing a hypothesis with a symbol aligned correlation comprising receiving a hypothesis, determining a start and a stop condition, selecting samples from a received sequence based on the start condition, and providing the samples and hypothesis to a correlator.

In accordance with another preferred embodiment of the present invention, a circuit comprising a search control unit coupled to a hypothesis memory, the search control unit containing circuitry to provide a start and stop condition for a correlation based on a hypothesis read from the hypothesis memory, a searcher coupled to the search control unit, the searcher containing circuitry to select a subset of samples from a received sequence based on instructions from the search control unit, correlate the subset of samples with a pseudo-random number sequence, and accumulate the correlation results, and a sequence generator coupled to the search control unit and the searcher, the sequence generator containing circuitry to generate the pseudo-random number sequence based on the hypothesis.

In accordance with another preferred embodiment of the present invention, a wireless device comprising an analog front end coupled to an antenna, the analog front end containing circuitry to filter and amplify a received signal provided by the antenna, an analog-to-digital converter (ADC), the ADC to convert an analog signal provided by the analog front end into a digital symbol stream, a search unit coupled to the ADC, the search unit containing circuitry to test hypotheses, wherein the tests are performed along symbol boundaries, and a processing unit coupled to the ADC, the processing containing circuitry to error detect and correct, decode and despread, and filter the digital symbol stream.

An advantage of a preferred embodiment of the present invention is by performing accumulations aligned with specific boundaries, the orthogonality of the signals is maintained and there is no interference due to these signals introduced in the accumulation of the desired signal. Therefore, system signal-to-noise ratio can be maximized.

A further advantage of a preferred embodiment of the present invention is that the present invention requires little additional hardware, hence implementation of the present invention can be accomplished with little additional cost.

Yet another advantage of a preferred embodiment of the present invention is that it can work with arbitrary dimensions of boundary size and accumulation length, so that maximum flexibility can be achieved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a direct sequence spread spectrum wireless communications system that may be compliant to CDMA (IS-95), CDMA2000, and the UMTS (Universal Mobile Telecommunications System) technical standards. An overview of the CDMA2000 technical standard is provided in a document entitled "Introduction to CDMA2000 Spread Spectrum Systems, Release 0," which is herein incorporated by reference. An overview of the UMTS technical standard is provided in a document entitled "$3^{rd}$ Generation Partnership Project; Technical Specifications Group Services and System Aspects General UMTS Architecture (Release 4)," which is herein incorporated by reference. The invention may also be applied, however, to other digital wireless communications systems that use direct sequence spread spectrum technology with orthogonal spreading codes.

Figure 1:
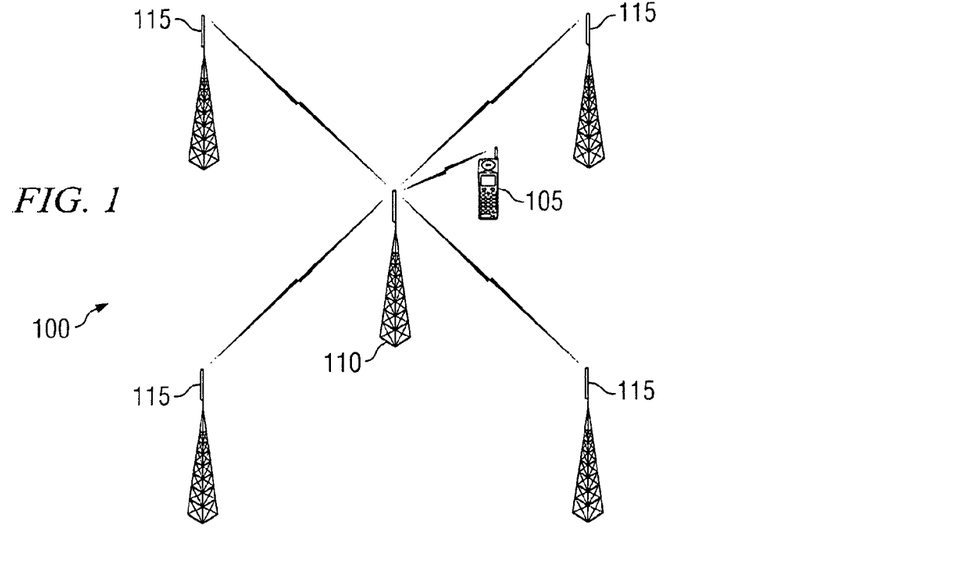
FIG. 1 is a diagram of an exemplary wireless communications system.

With reference now to FIG. 1, there is shown a diagram illustrating an exemplary wireless communications system 100. In the wireless communications system, there may be a mobile station 105 that is communicating with a base station 110. In addition to the base station 110, there may be a plurality of other base stations 115, which may be further away from the mobile station 105 than the base station 110. The mobile station 105, upon power-up, was able to synchronize with a signal from the base station 110 and hence began using the base station 110 to connect to the wireless communications system 100.

As discussed previously, in a code-division multiple access (CDMA) wireless communications system, such as an IS-95, CDMD2000, or UMTS compliant system, a mobile station is required to become synchronized with a base station upon power-up. The synchronization process requires that the mobile station perform a plurality of correlations of various offsets of a locally stored pseudo-random number (PN) sequence with a received signal. The correlation may also involve the application of various scrambling codes. Furthermore, the mobile station may be required to test received signals at various carrier frequencies.

The synchronization of the mobile station to a base station is normally performed in a portion of the mobile station commonly referred to as a searcher. The searcher receives as input, the received signals detected by the mobile station, usually in the form of a pair of sequences, I and Q. The searcher then correlates the I and Q sequences with a locally stored PN sequence set at a particular offset. The offset is commonly referred to as a PN offset and the process of correlating the received sequences with the PN sequence is commonly referred to as testing a hypothesis.

Figure 2:
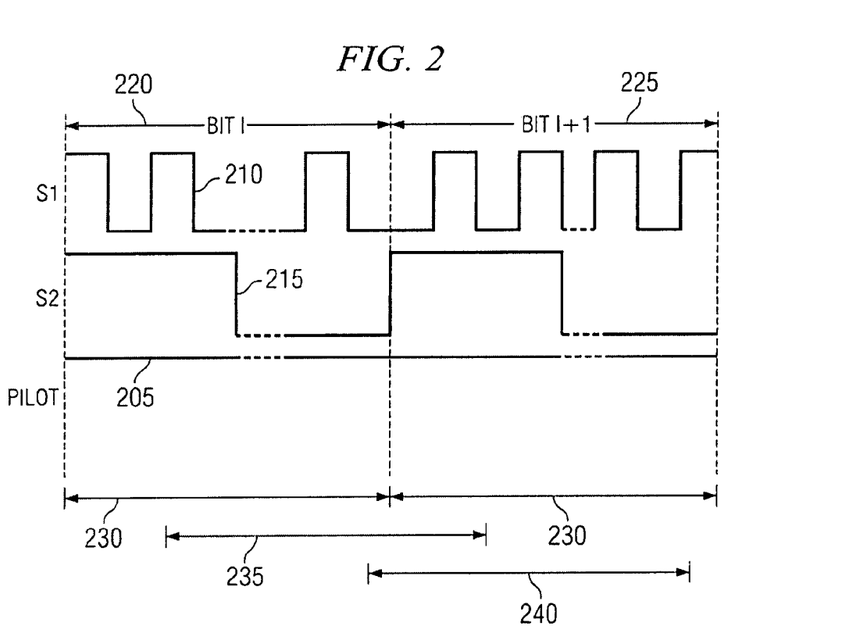
FIG. 2 is a timing diagram of several bit periods of signals in a direct sequence spread spectrum communications system.

With reference now to FIG. 2, there is shown a timing diagram illustrating several bit periods of signals that can be used in a direct sequence spread spectrum communications system with orthogonal spreading codes. A first curve 205 displays a signal being carried on a pilot channel, while a second curve 210 displays a signal being carried on channel S1 and a third curve 215 displays a signal being carried on channel S2. Note that the channels S1 and S2 are spread using orthogonal spreading codes and that as illustrated in FIG. 2, the spreading codes are orthogonal on a bit-wise basis. This implies that if a bit-aligned accumulation takes place, the signals on channels S1 and S2 do not interfere with one another. Bits I (interval 220) and I+1 (interval 225) of signals on channels S1, S2, and the pilot channel are displayed in FIG. 2.

Several highlights illustrate exemplary accumulation intervals for the pilot channel. A first accumulation of the pilot channel (highlight 230), aligned with the bits of signals on channels S1 and S2, results in the retention of the orthogonal properties of the signals. Therefore, the signals on channels S1 and S2 have no effect upon the accumulation of the pilot channel. A second accumulation of the pilot channel (highlight 235) begins slightly after the beginning of bit I (interval 220) and ends slightly after the beginning of bit I+1 (interval 225). Hence the orthogonality of the signals on channels S1 and S2 is not maintained and the signals on channels S1 and S2 appear in the accumulation of the pilot channel as noise. A third accumulation of the pilot channel (highlight 240) begins slightly before the end of bit I (interval 220) and ends slightly before the end of bit I+1 (interval 225). Once again, since the accumulation is not bit-aligned, the orthogonality of the signals on channels S1 and S2 is not maintained and they appear in the accumulation as noise.

Figure 3:
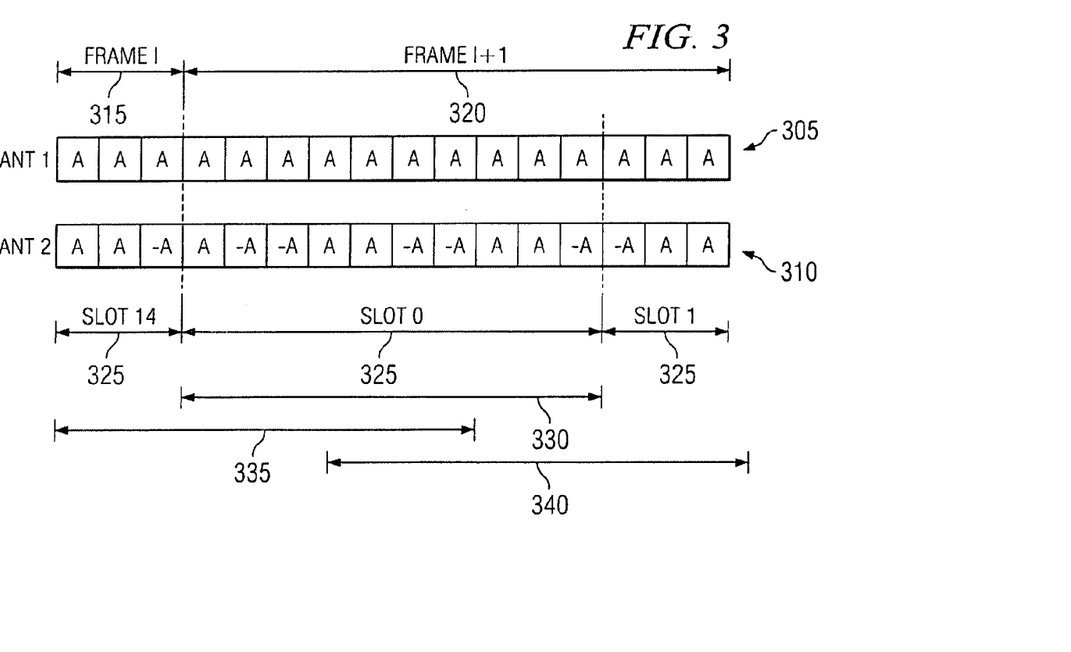
FIG. 3 is a timing diagram of a modulation pattern for a direct sequence spread spectrum communications system using transmit antenna diversity.

With reference now to FIG. 3, there is shown a timing diagram illustrating a modulation pattern for a direct sequence spread spectrum communications system using transmit antenna diversity. FIG. 3 displays a portion of the transmission pattern at the end of transmission frame I (interval 315) and a portion of the transmission pattern at the beginning of transmission frame I+1 (interval 320). A transmission frame comprises fifteen transmission slots, labeled slot #0 to slot #14, with each slot being of the same duration (interval 325). As displayed in FIG. 3, the direct sequence spread spectrum communications system uses two transmit antennas (the transmission pattern for antenna one is displayed as pattern 305 and the transmission pattern for antenna two is displayed as pattern 310) to implement a space-time transmit diversity scheme.

A first accumulation (displayed as highlight 330) is aligned with a transmission slot (slot #0), therefore the orthogonality of the transmit diversity scheme is retained. A second accumulation (highlight 335) and a third accumulation (highlight 340) are not aligned with a transmission slot, hence the orthogonality of the transmit diversity scheme is lost. An effect of the loss in the orthogonality of the transmit diversity scheme can be seen in the strength of the received signal, which will be discussed below.

Figure 4:
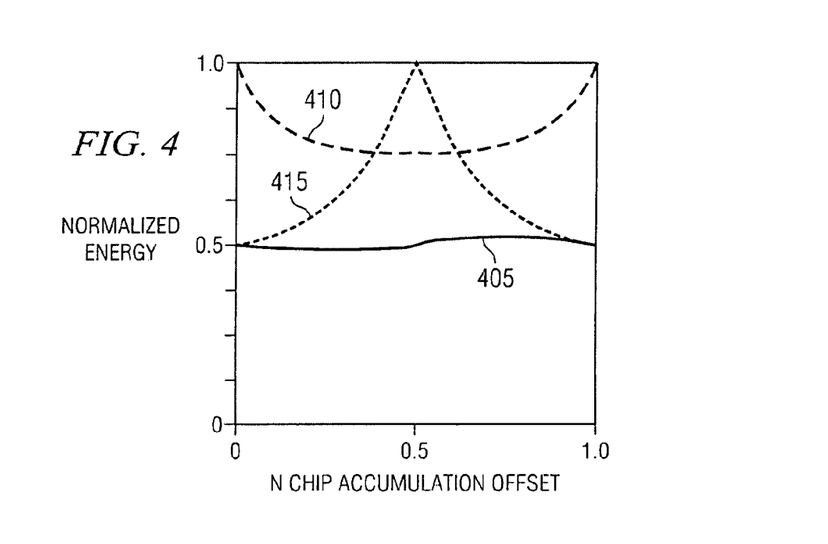
FIG. 4 is a data plot of normalized coherent accumulation energy as a function of normalized accumulation offset for a direct sequence spread spectrum communications system using transmit antenna diversity displayed in FIG. 3.

With reference now to FIG. 4, there is shown a data plot illustrating normalized coherent accumulation energy as a function of normalized symbol boundary offset. FIG. 4 illustrates normalized coherent accumulation energy of several different accumulation lengths (displayed as various curves) as a function of symbol boundary offset (normalized). For several of the accumulation lengths (displayed as curves 410 and 415), the symbol boundary offset plays a significant factor in the normalized coherent accumulation energy, with the energy varying by as much as 3 dB. For a third accumulation length (displayed as curve 405), the symbol boundary offset does not have a significant impact upon the normalized coherent accumulation energy.

Clearly, for some accumulation lengths, the symbol boundary offset can change the amount of energy accumulated. The relatively large difference in accumulated energy can present difficulties for communications systems that are using transmit diversity schemes, for example. In such circumstances, the signal transmitted from one antenna may appear to be significantly lower than the signal transmitted from another antenna. This can make it difficult for the receiver to detect the presence of the antenna with the low accumulated energy.

Figure 5:
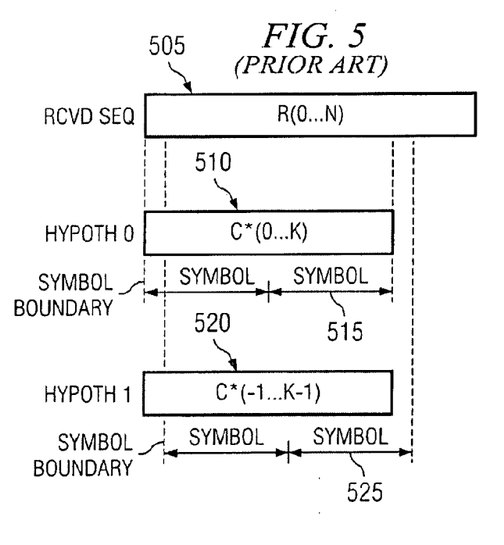
FIG. 5 is a diagram of a received sequence and several hypotheses, wherein the correlation misalignment of a hypothesis to the received sequence is highlighted.

With reference now to FIG. 5, there is shown a diagram illustrating a received sequence 505 and several hypotheses 510 and 520 in their symbol format, wherein the misalignment of a hypothesis to the received sequence is illustrated. As displayed in FIG. 5, the received sequence 505 is displayed as it is received, i.e., in groups of N+1 chips. For the hypotheses 510 and 520, several groups of K+1 chips are displayed. For the hypotheses 510 and 520, the groups of K+1 chips are displayed as they are generated by a sequence generator (not shown). However, due to differences in their PN offsets, the actual start (and finish) of symbols within the hypotheses 510 and 520 differ. For example, the hypothesis 510 has a PN offset so that the symbols are aligned with the groups of K+1 chips, as indicated by the alignment of a symbol duration interval 515 with the K+1 chips representing the hypothesis 510. On the other hand, the hypothesis 520 has a PN offset so that the symbols are misaligned with the groups of K+1 chips. This misalignment is displayed with a symbol duration interval 525 being slightly shifted to the right of the groups of K+1 chips representing the hypothesis 520.

Note that the hypotheses 510 and 520 are represented as groups of K+1 chips due to the fact that a vectorized searcher is used to perform the correlations and that the vectorized searcher operates on K+1 chips, where K is 15. The use of a non-vectorized searcher in place of the vectorized searcher can remove the need to organize the hypotheses 510 and 520 in groups of K+1 chips. However, alignment and misalignment of the correlation with symbol boundaries can still take place and the present invention remains applicable. For example, the correlation of chip R[0] with chip C*[0] (from hypothesis 510) would be symbol aligned while chip R[0] with chip C*[−1] (from hypothesis 520) would not be symbol aligned. However, the correlation of chip R[1] with chip C*[0] (from hypothesis 520) would be symbol aligned.

Since there is a symbol boundary misalignment with hypothesis 520, the contents of the groups of K+1 chips are labeled differently from the contents of the groups of K+1 chips for the received sequence 505 and the hypothesis 510. For example, a first group of K+1 chips for the hypothesis 510 may be labeled C*[0 . . . K], while a first group of K+1 chips for the hypothesis 520 may be labeled C*[−1 . . . K−1], since the start of a group of K+1 chips (chip 0) is actually the second chip in the hypothesis 520. Therefore, a correlation (and subsequent accumulation) of the received sequence 505 with the hypothesis 520 is misaligned.

The correlation can be expressed mathematically as: $x(\tau)$ $$x(\tau) = \sum_{k=0}^{length-1} r(k)c*(k-\tau),$$

where x( ) is the correlation result, r( ) is the received sequence, c*( ) is the hypothesis, and $\tau$ is the correlation offset (PN offset). The correlation, performed as expressed can permit the correlation of a single received sequence with a plurality of generated PN sequences.

In order to ensure that correlations (and hence accumulations) are aligned along symbol boundaries, two conditions need to be met. A first condition specifies that the correlation (and accumulation) must be of a length that is an integer multiple of the symbol duration. A second condition specifies that the correlation (and accumulation) must begin at the beginning of a symbol. The first condition can be met readily through the proper specification of the correlation and the hypotheses. The second condition may require modification to the way that correlations are performed.

Figure 6:
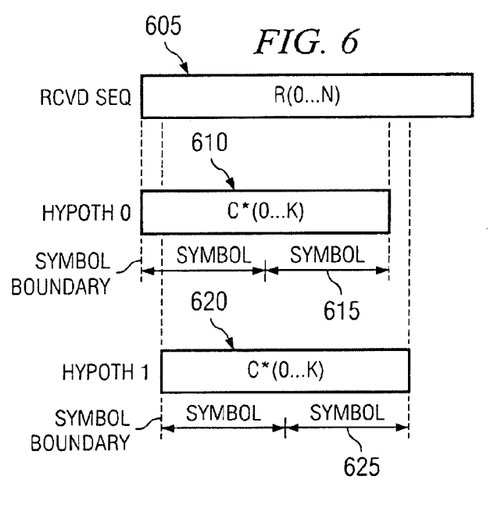
FIG. 6 is a diagram of a received sequence and several hypotheses, wherein the correlation has been modified to prevent the misalignment of the hypotheses to the received sequence, according to a preferred embodiment of the present invention.

With reference now to FIG. 6, there is shown a diagram illustrating a received sequence 605 and several hypotheses 610 and 620, wherein the correlation of the received sequence 605 with the hypotheses 610 and 620 is performed differently to ensure symbol alignment may be maintained, according to a preferred embodiment of the present invention. The prior art correlation discussed above (expressed mathematically as $$x(\tau) = \sum_{k=0}^{length-1} r(k)c*(k-\tau)\Bigg)$$

can be rewritten as:

$$x(\tau) = \sum_{k=0}^{length-1} r(k+\tau)c*(k)$$

When expressed in such a manner, maintaining alignment during correlation can be readily performed. As rewritten, the correlations can be performed by receiving a number of chips of the received sequence 605, more than needed for a correlation with a single hypothesis. Then, when provided with a hypothesis (such as hypothesis 610 or 620), the appropriate chips from the received sequence 605 can be selected and correlated with the hypothesis. For example, in FIG. 6, because of hypothesis 610's PN offset, a PN sequence generated from the hypothesis 610 can be correlated with chips 0 to K of the received sequence. However, in the case of hypothesis 620, in order to maintain alignment with symbol boundaries, chips 1 to K+1 of the received sequence can be correlated with the PN sequence generated from the hypothesis 620. This is illustrated in FIG. 6 by the alignment of hypotheses 610 and 620 with symbol duration intervals 615 and 625, respectively.

According to a preferred embodiment of the present invention, using the correlation technique outlined in FIG. 6 can require that the receiver receive more chips of the received sequence than what is actually needed to perform an actual correlation. For example, using a vectorized searcher with a correlation length of 16 chips, it would be necessary for the receiver to store 31 chips of the received sequence. The 31 chips is needed to support a worst case situation wherein a hypothesis has a PN offset that has its correlation beginning with the last chip of a 16 chip received sequence (R[15]). With the correlation beginning at R[15], then 15 additional chips are needed to complete the correlation, for a total of 31 chips. If the hypothesis has a PN offset that has its correlation beginning at the 17$^{th}$ chip (R[16]), then the correlation could actually be performed by wrapping the received sequence back to R[0]. With a sequential searcher that correlates 1 chip at a time, a 31 chip buffer for the chips would not be necessary; rather, a 1 chip buffer would be required.

Figure 7:
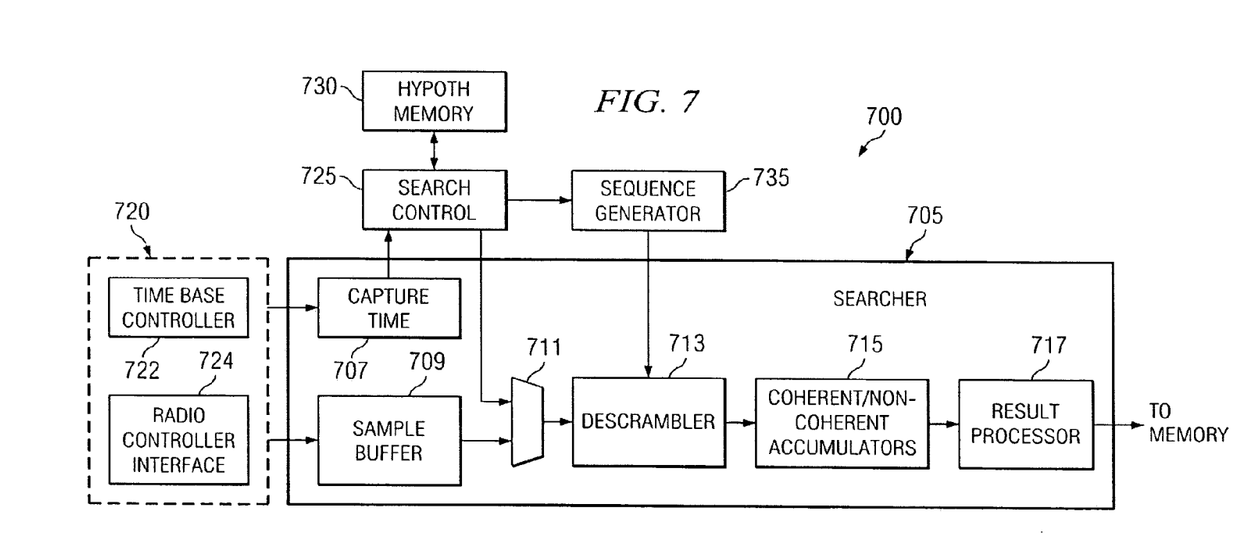
FIG. 7 is a diagram of a portion of a wireless receiver used to search for direct sequence spread spectrum signals, according to a preferred embodiment of the present invention.

With reference now to FIG. 7, there is shown a diagram illustrating a portion of a wireless receiver 700 used to search for direct sequence spread spectrum signals, according to a preferred embodiment of the present invention. The portion of the wireless receiver 700 used to search for direct sequence spread spectrum signals can make use of the modified correlation method disclosed in FIG. 6 to performed symbol boundary aligned correlations between a received signal and hypotheses. The parts of the wireless receiver 700 used in the searching can include a searcher 705, a radio-frequency (RF) section 720, a search control unit 725, a hypothesis memory 730, and a sequence generator 735.

The searcher 705 can be used to perform the actual search for the direct sequence spread spectrum signals. Like a typical searcher implementing the correlation technique disclosed in FIG. 5, the searcher 705 performs its search by first correlating chips from a received sequence with a locally generated version of the chips (adjusted by a specified offset) in a descrambler 713. For example, in the case of pilot channel searches, the searcher 705 will use a locally generated version of the PN sequence being transmitted on the pilot channel (again, after being adjusted by a specified offset) to correlate with the received pilot channel. After the correlation, the searcher 705 may perform both coherent and non-coherent accumulation of the correlation results in a coherent/non-coherent accumulator 715. Finally, the accumulations may be processed by a result processor 717. As example of result processor 717 operation, the accumulations performed in the coherent/non-coherent accumulator 715 can be compared against prespecified thresholds in the result processor 717. The hypotheses with accumulations that exceed the prespecified threshold may be determined to be good hypotheses and saved, while ones with accumulations that do not exceed the prespecified thresholds can be discarded. The good hypotheses may be saved to memory for later use.

The searcher 705 includes a sample buffer 709 which can be used to store samples of the chips in the received signal to be used in subsequent correlations. A multiplexer 711 can be used to select subsets of the samples of the received signal to be correlated. For example, using a sample buffer of size 31 chips and a 16 chip length correlation, the multiplexer 711 can be a 31-16 multiplexer, i.e., a multiplexer that can select 16 chips out of the 31 chip buffer. The searcher 705 may also include a capture time unit 707 which can be responsible for providing a timing reference that is based upon the local time in the wireless receiver 700 and timing information derived from the received signal.

The radio frequency (RF) section 720 may include a RF control interface 724 and a time base controller 722 and can be used to control RF hardware used to receive the signal transmitted over-the-air to the wireless receiver 700. The RF section 720 may then provide the received signal to the searcher 705, preferably in the form of two sequences (an I and a Q sequence) along with a timing reference signal.

The searcher control unit 725 can provide necessary control information to the searcher 705 to ensure that the searcher 705 is correlating the proper chips from the received sequence with the proper PN sequences generated from different hypotheses. The searcher control 725 can retrieve hypotheses to be tested from the hypothesis memory 730. According to a preferred embodiment of the present invention, the hypothesis memory 730 may store the hypotheses in sets of search parameters, wherein a set of search parameters may specify one or more hypotheses. These sets of parameters, when combined with the timing reference (provided by the capture time unit 707), can be used to generate the actual hypotheses to be tested. The hypotheses to be test can then be provided to the sequence generator 735. The sequence generator 735 can then generate PN sequences based on the hypotheses.

In addition to being used to generate PN sequences in the sequence generator 735, each hypothesis can be provided to the multiplexer 711 and be used to select the proper subset of chip samples from the received sequence stored in the sample buffer 709. It is this subset of chip samples from the multiplexer 711 that can be correlated with the PN sequence provided by the sequence generator 735.

Figure 8:
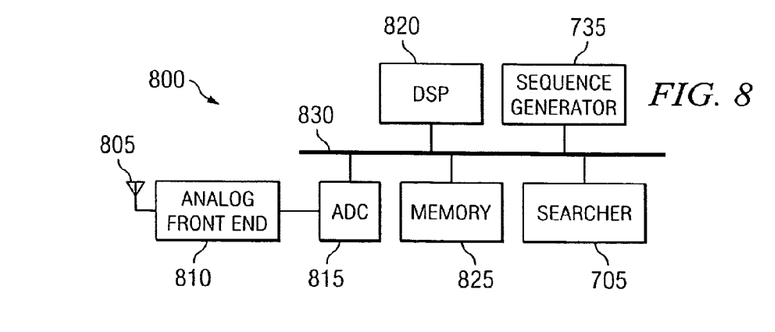
FIG. 8 is a diagram of a wireless device, according to a preferred embodiment of the present invention.

With reference now to FIG. 8, there is shown a diagram illustrating a wireless device 800, according to a preferred embodiment of the present invention. The wireless device 800 includes an analog front end 810 which receives signals transmitted over-the-air and detected by an antenna 805. The analog front end 810 may be used to filter the received signal to help eliminate out-of-band noise and interference, equalize and amplify the received signal to bring the received signal to a power level that is suitable for processing, and so forth. An analog-to-digital converter (ADC) 815 can be used to convert the analog received signal into its digital representation.

Digital symbols, produced by the ADC 815, may then be provided to a digital signal processing unit 820. The digital signal processing unit may be responsible for functions such as error detecting and correcting of the digital symbols, decoding and despreading the symbol stream, deinterleaving and depuncturing the symbol stream, and so on. A memory 825 may be used to store some or part of the symbol stream, data decoded from the symbol stream, search hypotheses, used as scratch memory, and so forth. The searcher 705 (containing a searcher control unit), and sequence generator 735 may be as described in FIG. 7. Coupling these units together can be a high-speed communications bus 830.

Figure 9:
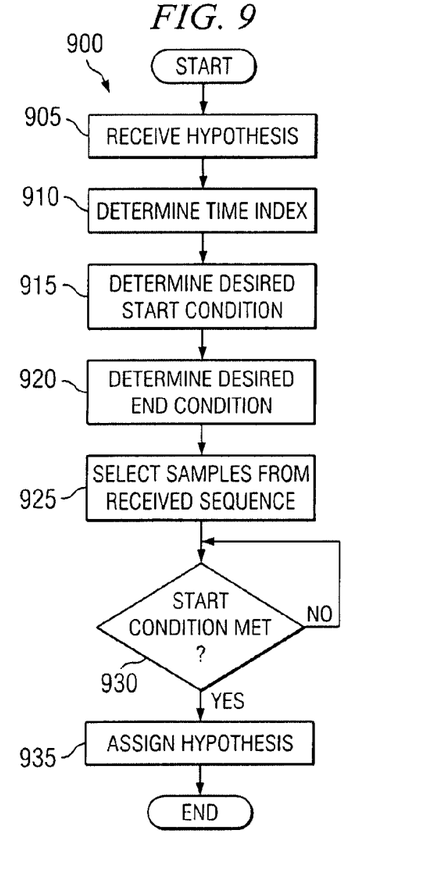
FIG. 9 is a flow diagram of an algorithm used to ensure the alignment of correlations and accumulations along symbol boundaries, according to a preferred embodiment of the present invention.

With reference now to FIG. 9, there is shown a flow diagram illustrating an algorithm 900 used to ensure the alignment of correlations and accumulations along symbol boundaries, according to a preferred embodiment of the present invention. According to a preferred embodiment of the present invention, the algorithm 900 may be implemented within a searcher control unit (such as the searcher control unit 725 (FIG. 7)). According to a preferred embodiment of the present invention, the algorithm 900 operates in real-time. Therefore, the algorithm 900 may typically be implemented as a custom designed integrated circuit or in firm ware to provide adequate performance. Alternatively, the algorithm 900 may executed on a mobile control unit (MCU) (not shown), which can be responsible for controlling the operation of various parts of a wireless device, if the MCU has sufficient processing power to provide real-time operation.

The searcher control unit 725 can begin execution of the algorithm 900 when it receives a hypothesis (hypotheses) (block 905). The hypothesis may have been stored in a hypothesis memory (such as the hypothesis memory 730 (FIG. 7)) in the form of search parameters, which can then be combined with a timing reference to produce one or more hypotheses. Alternatively, the hypothesis may have simply been stored as a single hypothesis in the hypothesis memory 730. After receiving the hypothesis, the searcher control unit 725 can determine a time index (block 910). According to a preferred embodiment of the present invention, a time index for a given hypothesis is equal to the time_stamp (i.e., the timing reference) minus the hypothesis offset (i.e., the PN offset) modulo the code length.

The searcher control unit 725 can then determine a start condition to begin correlation and coherent accumulation (block 915). The desired start condition may be expressed as when the time index is equal to zero modulo the symbol length. In other words, the desired start condition is when the time index is an integer multiple of the symbol length. For example, if symbol length (N) is a power of 2, then if the time index can be expressed as $t_m, t_{m-1}, t_{m-2}, \ldots t_1, t_0$, then $t_{n-1}, t_{n-2}, \ldots, t_0$ are all equal to zero (where $n=\log_2 N$). The searcher control unit 725 can also determine a condition to end coherent accumulation (block 920). The desired condition to end the coherent accumulation can be expressed as symbol length-16 modulo symbol length, wherein 16 is the length of the partial correlation. Referring back to the example where the symbol length is a power of 2, then the desired condition to end the coherent accumulation may be when $t_{n-1}, t_{n-2}, \ldots, t_0$ are all equal to one (where $n=\log_2 N$). Note that in situations when the symbol length is not a power of 2, combinatorial logic can be used to dictate start and end conditions. The use of combinatorial logic to force start and end conditions is considered to be well understood by those of ordinary skill in the art of the present invention and will not be discussed herein.

The searcher control unit 725 can then select the desired chip samples from a sample buffer (such as the sample buffer 709 (FIG. 7)) (block 925). According to a preferred embodiment of the present invention, the searcher control unit 725 can provide information to a multiplexer (such as the multiplexer 711 (FIG. 7)) in order for multiplexer 711 to select the desired chip samples from the sample buffer 709. After the desired chip samples have been selected (block 925), the searcher control unit 725 can wait until the desired start conditions are met (block 930). Once the desired start conditions have been met, the hypothesis can be assigned to a correlator (block 935) and the testing of the hypothesis can begin.

According to a preferred embodiment of the present invention, if the accumulation time, L, should be an integer multiple of the symbol length, N, i.e., L=kN, wherein k is an integer, then a correlator can begin correlating at any one of k locations. This can result in the need for a counter in each correlator.

According to another preferred embodiment of the present invention, in the case when the accumulation time, L, should be an integer multiple of the symbol length, N, correlations may be forced to occur on an accumulation boundary. Since L=kN, symbol alignment can be trivially obtained (0 modulo L=0 modulo N). Therefore, at the expense of increased latency to begin a correlation, the need to have a counter for each correlator can be eliminated.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing a received sequence comprising:
   receiving a hypothesis;
   determining a start and a stop condition;
   selecting samples from the received sequence based on the start condition; and
   providing the samples and hypothesis to a correlator, wherein the start condition aligns the samples and hypothesis on a symbol boundary.

2. The method of claim 1, wherein the start condition may be expressed as when a time index modulo N is equal to zero, where N is a length of a symbol.

3. The method of claim 2, wherein when N is a power of 2, then if the time index is expressed as $t_m, t_{m-1}, t_{m-2}, \ldots t_1, t_0$, then $t_{n-1}, t_{n-2}, \ldots, t_0$ are equal to zero, where $n=\log_2 N$.

4. The method of claim 1, wherein the stop condition may be expressed as when a time index is equal to (N-partial correlation length) modulo N, where N is a length of a symbol and partial correlation length is a number of chips being correlated together.

5. The method of claim 4, wherein when N is a power of 2, then if the time index is expressed as $t_m, t_{m-1}, t_{m-2}, \ldots t_1, t_0$, then $t_{n-1}, t_{n-2}, \ldots, t_0$ are equal to one, where $n=\log_2 N$.

6. The method of claim 1, wherein the samples are selected from a group of sampled chips from the received sequence.

7. The method of claim 6, wherein the group of sampled chips is of size 2*correlation length −1, where correlation length is a number of chips being correlated together.

8. The method of claim 1, wherein the samples are selected based on the start and stop conditions.

9. The method of claim 1 further comprising after the selecting, waiting for the starting condition to be met.

10. The method of claim 1, wherein the hypothesis is a plurality of hypotheses, and wherein the determining, selecting, and providing are performed for each hypothesis in the plurality of hypotheses.

11. The method of claim 1 further comprising after the providing:
   generating a pseudo-random sequence based on the hypothesis;
   correlating the pseudo-random sequence with the samples;
   accumulating the correlation results; and
   processing the accumulation result.

12. The method of claim 11, wherein the accumulating comprises both coherent and non-coherent accumulation.

13. The method of claim 11, wherein the processing comprises comparing the accumulation result with a predetermined threshold.

14. The method of claim 13, wherein the hypothesis is declared a good match if the accumulation result exceeds the predetermined threshold.

15. A circuit comprising:
   a search control unit coupled to a hypothesis memory, the search control unit containing circuitry to provide a start and stop condition for a correlation based on a hypothesis read from the hypothesis memory;
   a searcher coupled to the search control unit, the searcher containing circuitry to select a subset of samples from a received sequence based on instructions from the search control unit, correlate the subset of samples with a pseudo-random number sequence, and accumulate the correlation results; and
   a sequence generator coupled to the search control unit and the searcher, the sequence generator containing circuitry to generate the pseudo-random number sequence based on the hypothesis;
   wherein the searcher comprises:
   a multiplexer coupled to a received sequence input, the multiplexer containing circuitry to select the subset of samples from the received sequence based on the start and stop condition provided by the search control unit;
   a descrambler coupled to the multiplexer and the sequence generator, the descrambler containing circuitry to correlate the subset of samples from the multiplexer with the pseudo-random number sequence from the sequence generator; and
   an accumulator coupled to the descrambler, the accumulator containing circuitry to coherently and non-coherently accumulate the correlation results.

16. The circuit of claim 15, wherein the searcher further comprises a result processor coupled to the accumulator, the result processor containing circuitry to determine if the pseudo-random number sequence was a good match for the subset of samples.

17. The circuit of claim 15, wherein the searcher further comprises a sample buffer coupled to the multiplexer, the sample buffer to store samples of the received sequence.

18. The circuit of claim 17, wherein the sample buffer is capable of storing 2*correlation length −1 samples of the received sequence, where correlation length is the number of samples being correlated together.

19. A circuit comprising:
   a search control unit coupled to a hypothesis memory, the search control unit containing circuitry to provide a start and stop condition for a correlation based on a hypothesis read from the hypothesis memory;

a searcher coupled to the search control unit, the searcher containing circuitry to select a subset of samples from a received sequence based on instructions from the search control unit, correlate the subset of samples with a pseudo-random number sequence, and accumulate the correlation results; and a sequence generator coupled to the search control unit and the searcher, the sequence generator containing circuitry to generate the pseudo-random number sequence based on the hypothesis;

wherein the hypothesis stored in the hypothesis memory is stored as a set of search parameters, and wherein the hypothesis is derived from the set of search parameters and a timing reference.

20. A wireless device comprising:

an analog front end coupled to an antenna, the analog front end containing circuitry to filter and amplify a received signal provided by the antenna;

an analog-to-digital converter (ADC), the ADC to convert an analog signal provided by the analog front end into a digital symbol stream;

a search unit coupled to the ADC, the search unit containing circuitry to test hypotheses, wherein the tests are performed such that each hypothesis is aligned along symbol boundaries; and a processing unit coupled to the ADC, the processing unit containing circuitry to error detect and correct, decode and despread, and filter the digital symbol stream.

21. The wireless device of claim 20, wherein the wireless device operates in a digital wireless communications network.

22. The wireless device of claim 21, wherein the digital wireless communications network is a UMTS compliant communications network.

23. The wireless device of claim 21, wherein the digital wireless communications network is a CDMA2000 compliant communications network.

24. A wireless device comprising:

an analog front end coupled to an antenna, the analog front end containing circuitry to filter and amplify a received signal provided by the antenna;

an analog-to-digital converter (ADC), the ADC to convert an analog signal provided by the analog front end into a digital symbol stream;

a search unit coupled to the ADC, the search unit containing circuitry to test hypotheses, wherein the tests are performed along symbol boundaries; and a processing unit coupled to the ADC, the processing unit containing circuitry to error detect and correct, decode and despread, and filter the digital symbol stream;

wherein the search unit comprises:

a search control unit coupled to a hypothesis memory, the search control unit containing circuitry to provide a start and stop condition for a correlation based on a hypothesis read from the hypothesis memory;

a searcher coupled to the search control unit, the searcher containing circuitry to select a subset of samples from a received sequence based on instructions from the search control unit, correlate the subset of samples with a pseudo-random number sequence, and accumulate the correlation results; and a sequence generator coupled to the search control unit and the searcher, the sequence generator containing circuitry to generate the pseudo-random number sequence based on the hypothesis.

25. The wireless device of claim 24, wherein the searcher comprises:

a multiplexer coupled to a received sequence input, the multiplexer containing circuitry to select the subset of samples from the received sequence based on the start and stop condition provided by the search control unit;

a descrambler coupled to the multiplexer and the sequence generator, the descrambler containing circuitry to correlate the subset of samples from the multiplexer with the pseudo-random number sequence from the sequence generator; and an accumulator coupled to the descrambler, the accumulator containing circuitry to coherently and non-coherently accumulate the correlation results.

* * * * *